(12) United States Patent
Feldkamp

(10) Patent No.: US 10,945,145 B2
(45) Date of Patent: *Mar. 9, 2021

(54) NETWORK RECONFIGURATION USING GENETIC ALGORITHM-BASED PREDICTIVE MODELS

(71) Applicant: AT&T Intellectual Property I, L.P., Atlanta, GA (US)

(72) Inventor: Gregory E. Feldkamp, Southlake, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/558,282

(22) Filed: Sep. 2, 2019

(65) Prior Publication Data

US 2019/0387422 A1    Dec. 19, 2019

Related U.S. Application Data

(63) Continuation of application No. 15/820,015, filed on Nov. 21, 2017, now Pat. No. 10,405,219.

(51) Int. Cl.
*H04W 24/08* (2009.01)
*H04W 16/18* (2009.01)
(Continued)

(52) U.S. Cl.
CPC ......... *H04W 24/08* (2013.01); *H04L 41/0803* (2013.01); *H04W 16/18* (2013.01); *H04W 24/02* (2013.01); *H04W 88/08* (2013.01)

(58) Field of Classification Search
CPC ..... H04W 24/08; H04W 24/02; H04W 16/18; H04W 88/08; H04L 41/0803
(Continued)

(56) References Cited

U.S. PATENT DOCUMENTS

| 6,829,491 | B1 | 12/2004 | Yea et al. |
| 7,711,662 | B2 * | 5/2010 | Buscema ............... G06N 3/086 706/13 |

(Continued)

FOREIGN PATENT DOCUMENTS

| WO | 2006011866 A2 | 8/2006 |
| WO | 2015196743 A1 | 12/2015 |

(Continued)

OTHER PUBLICATIONS

Belschner et al., "Optimisation of radio access network operation introducing self-x functions: use cases, algorithms, expected efficiency gains", Vehicular Technology Conference, 2009. VTC Spring 2009. IEEE 69th (2009). 5 Pages. http://tns.ted.unipi.gr/ktsagkaris/img/papers/conference/c38.pdf.

(Continued)

*Primary Examiner* — Mong-Thuy T Tran

(57) ABSTRACT

An example method may include a processing system including at least one processor determining a final weight set comprising weight factors to apply to each of a plurality of performance indicators for a predictive model associated with a target performance indicator using a genetic algorithm. The method may further include the processing system gathering a first plurality of measurements of the plurality of performance indicators for at least a portion of a cellular network, applying the predictive model to the first plurality of measurements of the plurality of performance indicators to generate a prediction for the target performance indicator, and adjusting at least one aspect of the cellular network in response to the prediction.

20 Claims, 4 Drawing Sheets

(51) Int. Cl.
*H04L 12/24* (2006.01)
*H04W 24/02* (2009.01)
*H04W 88/08* (2009.01)

(58) Field of Classification Search
USPC .................................................. 370/328, 329
See application file for complete search history.

(56) References Cited

U.S. PATENT DOCUMENTS

| | | | |
|---|---|---|---|
| 8,885,565 | B2 | 11/2014 | van de Ven et al. |
| 8,942,753 | B2 | 1/2015 | Chen et al. |
| 9,031,561 | B2 * | 5/2015 | Nuss .................... H04W 24/02 |
| | | | 455/436 |
| 9,047,570 | B2 | 6/2015 | Ho et al. |
| 9,325,596 | B2 | 4/2016 | King et al. |
| 9,420,541 | B2 | 8/2016 | Zhao et al. |
| 9,439,081 | B1 * | 9/2016 | Knebl .................... H04W 16/22 |
| 9,641,605 | B2 | 5/2017 | Patterson et al. |
| 9,730,086 | B2 | 8/2017 | Flanagan et al. |
| 9,900,790 | B1 * | 2/2018 | Sheen .................... G06N 20/00 |
| 2009/0024546 | A1 | 1/2009 | Ficcaglia et al. |
| 2014/0057627 | A1 | 2/2014 | Hejazi et al. |
| 2015/0138989 | A1 | 5/2015 | Polehn et al. |
| 2016/0073313 | A1 | 3/2016 | Hejazi et al. |
| 2016/0212633 | A1 | 7/2016 | Flanagan et al. |
| 2016/0248624 | A1 * | 8/2016 | Tapia .................... H04L 41/5009 |
| 2016/0269917 | A1 | 9/2016 | Hillegas et al. |
| 2016/0320768 | A1 * | 11/2016 | Zhao .................... G05B 23/0281 |
| 2017/0012847 | A1 | 1/2017 | Liensberger et al. |
| 2017/0034720 | A1 | 2/2017 | Gopalakrishnan et al. |
| 2017/0064591 | A1 | 3/2017 | Padfield et al. |
| 2017/0070396 | A1 | 3/2017 | Flanagan et al. |
| 2017/0127303 | A1 | 5/2017 | Austin et al. |
| 2017/0147985 | A1 | 5/2017 | Sampath et al. |
| 2017/0221032 | A1 | 8/2017 | Mazed et al. |
| 2017/0245176 | A1 | 8/2017 | Murphy et al. |
| 2017/0359754 | A1 | 12/2017 | Yousefi'zadeh et al. |
| 2018/0330300 | A1 * | 11/2018 | Runkana .......... G06Q 10/06393 |

FOREIGN PATENT DOCUMENTS

| | | |
|---|---|---|
| WO | 2017116627 A1 | 7/2017 |
| WO | 2017142840 A1 | 8/2017 |

OTHER PUBLICATIONS

Mehboob et al., "Genetic algorithms in wireless networking: techniques, applications, and issues", Soft Computing vol. 20 Issue 6 (Jun. 2016): 2467-2501. 27 Pages. http://arxiv.org/pdf/1411.5323.pdf.

Prasad et al., "Network reconfiguration for load balancing in radial distribution systems using genetic algorithm", Electric Power Components and Systems vol. 36 Issue 1 (2008): pp. 63-72. ftp://gias720.dis.ulpgc.es/pbu/CursoAprendizajeAdaptacion/Trabajo1011/LoadBalancingGA.pdf.

* cited by examiner

NETWORK RECONFIGURATION USING GENETIC ALGORITHM-BASED PREDICTIVE MODELS

This application is a continuation of U.S. patent application Ser. No. 15/820,015, filed Nov. 21, 2017, now U.S. Pat. No. 10,405,219, which is herein incorporated by reference in its entirety.

The present disclosure relates generally to wireless communication networks, and more particularly to devices, non-transitory computer readable media, and methods for adjusting at least one aspect of a cellular network using a predictive model based upon a genetic algorithm.

BACKGROUND

Cellular network operators obtain a large number of measurements of key performance indicators (KPIs) with respect to various aspects of the cellular network. The KPIs are used for a variety of purposes such as network planning and upgrading, troubleshooting, load balancing between core network components, beam management, inter-cell coordination, and so forth.

SUMMARY

In one example, the present disclosure discloses a method, computer-readable medium, and device for adjusting at least one aspect of a cellular network using a predictive model based upon a genetic algorithm. For example, a method may include a processing system including at least one processor determining a final weight set comprising weight factors to apply to each of a plurality of performance indicators for a predictive model associated with a target performance indicator using a genetic algorithm. The method may further include the processing system gathering a first plurality of measurements of the plurality of performance indicators for at least a portion of a cellular network, applying the predictive model to the first plurality of measurements of the plurality of performance indicators to generate a prediction for the target performance indicator, and adjusting at least one aspect of the cellular network in response to the prediction.

BRIEF DESCRIPTION OF THE DRAWINGS

The teachings of the present disclosure can be readily understood by considering the following detailed description in conjunction with the accompanying drawings, in which.

To facilitate understanding, similar reference numerals have been used, where possible, to designate elements that are common to the figures.

DETAILED DESCRIPTION

Figure 1:
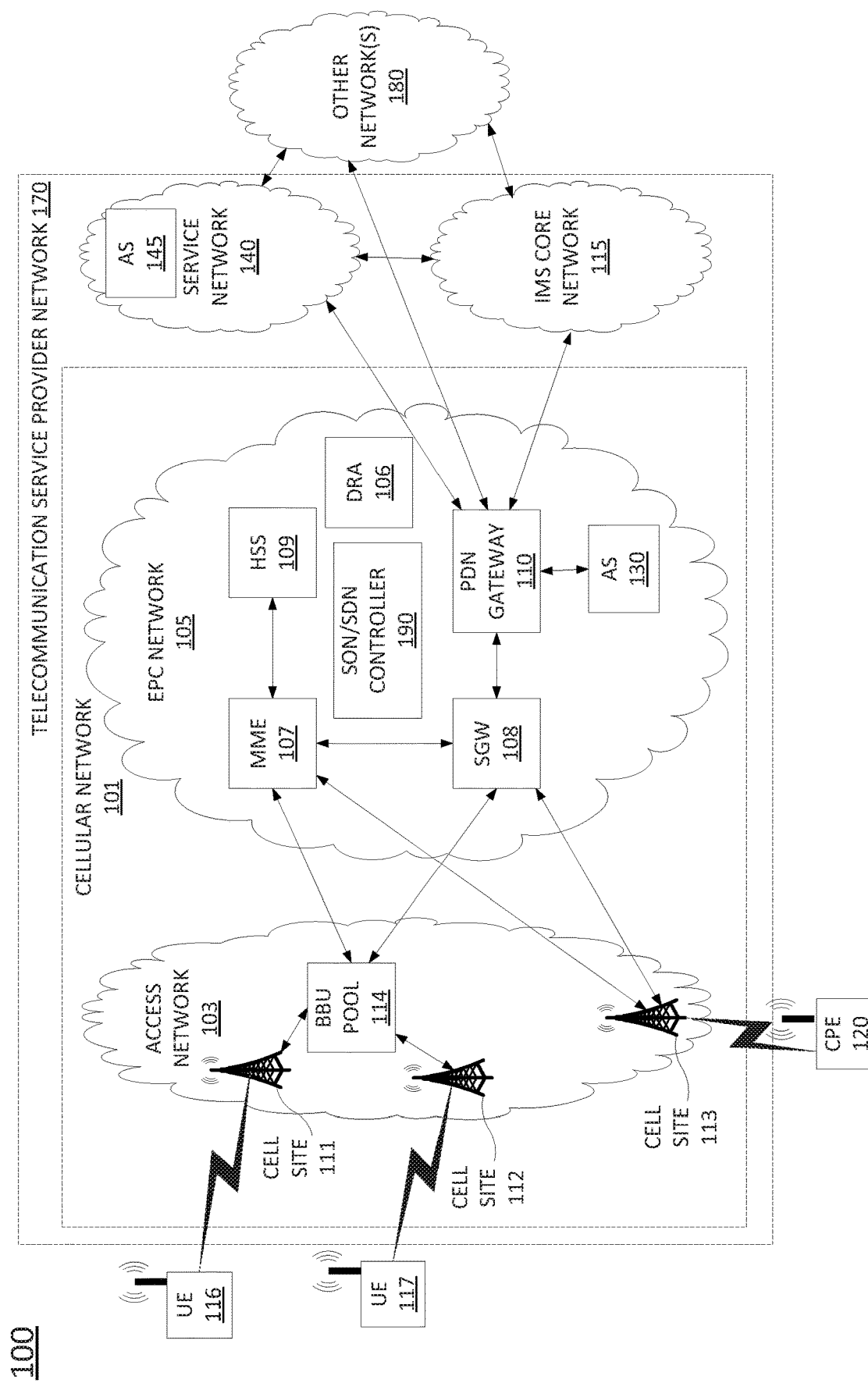
FIG. 1 illustrates a block diagram of an example system, in accordance with the present disclosure.

The present disclosure broadly discloses methods, computer-readable media, and devices for adjusting at least one aspect (e.g., at least one operational parameter) of a cellular network using a predictive model based upon a genetic algorithm. In particular, in one example, a genetic algorithm is used to optimize parameters for predicting degradation in a target performance indicator (e.g., a "key performance indicator" (KPI), such as dropped calls) at the radio access network (RAN) cell level based on measurements of other performance indicators collected at earlier points in time, without a formal analytical model. Instead, an initial candidate population of weight sets for combining performance indicator measurements is allowed to evolve over multiple generations to identify a weight set that maximizes the correlation between a weighted average of the input performance indicator measurements and measurements of the target performance indicator to be predicted. In particular, a genetic algorithm mimics natural selection that occurs in biological systems, i.e., the genetic algorithm is applied over a plurality of generations, e.g., a plurality of generations of candidate weight sets.

In one example, an initial generation of candidate weight sets is first generated. The fitness of a given candidate weight set in the generation for predicting a value of a target performance indicator is assessed based on a correlation between the historical time series for the target performance indicator and an aggregate metric time series generated using the given candidate weight set applied to the predictive model. In one example, a new generation of candidate weight set is generated using "crossover" (combining two weight sets) and "mutation," with fitter individuals (weight sets) given preference in forming the next generation. New generations are created iteratively in this fashion until a weight set with sufficient fitness for use in target performance indicator value prediction emerges.

The target performance indicator and input performance indicators may include a received signal strength, e.g., a reference signal received power (RSRP), a dropped call rate, a bit error rate, a packet loss rate, a round trip time, a delay measure, a number or percentage of beam failure events, radio link failure events, radio link interruption events, or random access procedure failure events, and so forth. For illustrative purposes, examples are described herein primarily with regard to a target performance indicator of a dropped call rate. However, it should be understood that examples of the present disclosure may apply to a variety of target performance indicators and may utilize a variety of possible input performance indicators for purposes of optimizing a weight set of a predictive model for a target performance indicator using a genetic algorithm.

In one example, the predictive model assumes a linear relationship between a target performance indicator at a lag time and an "aggregate metric" based upon a plurality of input performance indicator measurements from an earlier time. For instance, the target performance indicator may comprise a dropped call rate $D_c$ at a time $t+T$ and the predictive model may be in the form of the following Equation 1:

$$D_c(t+T) = a + b * Q_c(t) \qquad \text{Equation 1:}$$

where $D_c(t+T)$ is the dropped call rate at time $t+T$, where $Q_c(t)$ is an aggregate metric "$Q_c$" evaluated at an earlier time "$t$", where "T" is the lag time, where $Q_c(t)$ is derived from the selected input performance indicator measurements for a given portion of a cellular network (e.g., on a per-cell basis), and where parameter values "a" and "b" are identified through machine learning based on historical performance indicator measurements. As described herein, the goal of the genetic algorithm is to identify an aggregate metric $Q_c(t)$ that correlates strongly with the dropped call performance indicator, $D_c(t+T)$.

In one example, the aggregate metric $Q_c(t)$ is generated from a set of "N" performance indicator measurements $\{m_1(t), m_2(t), m_3(t), \ldots, m_N(t)\}$ (broadly, "input performance indicator measurements") related to a portion of the cellular network, e.g., for a given cell. For instance, $m_1(t)$ may represent a reference signal received power (RSRP) value and $m_2(t)$ may represent a timing advance (TA) value for the cell at time "t." In one example, each input performance indicator measurement is converted to a normalized version. In one example, the normalized measurement $q_n(t)$ at a given time "t" is the absolute value of the number of standard deviations that $m_n(t)$ differs from its historical mean over the recent past (e.g., over the past week, over the past day or two, over the past 12 hours, etc.). In one example, the absolute value is used to ensure that the normalized measurement value is non-negative regardless of whether the deviation from average of the measurement itself is positive or negative. In other words, $q_n(t)$ characterizes how far away from normal the measurement is regardless of direction.

In one example, the aggregate metric $Q_c(t)$ for the cell is calculated as a weighted average of the normalized measurements according to Equation 2:

$$Q_c(t)=w_1*q_1(t)+w_2*q_2(t)+w_3*q_3(t)+ \ldots +w_N*q_N(t) \quad \text{Equation 2:}$$

where the sum of the weights $w_1+w_2+w_3+ \ldots +w_n$ is 1. Thus, $Q_c(t)$ characterizes how far off "normal" the cell is based on the set of input performance indicator measurements. It should be noted that Equation 2 assumes that each weight falls within the range of 0 to 1. However, other scales could be used instead, such as 0 to 100 with the sum of the weights equal to 100. In one example, the goal is to find a set of weights $\{w_1, w_2, w_3, \ldots, w_N\}_T$ that provides the strongest correlation between the aggregate metric $Q_c(t)$ and the target KPI, e.g., the dropped call rate $D_c(t+T)$, such that if $Q_c$ is large, $D_c$ is likely to be large. In one example, a higher value of the KPI of interest is deemed to be worse operationally than a lower value (e.g., a higher dropped call rate is worse than a lower dropped call rate). But in a case where the "bad" direction of the KPI available for consideration is lower (e.g., call completion rate), it can be transformed to one that makes the higher direction "bad" (e.g., if the source KPI available in the data is call completion rate, then it can be transformed for purposes of this processing by subtracting it from 1, thus transforming it into a dropped call rate for use in the model). In one example, the genetic algorithm is applied to find an optimal weight set separately for a plurality of lag times of interest. For example, different weight sets may be optimized for different values of "T" ranging from 0 minutes to 2 hours in 15-minute intervals, or using any other time period(s) of interest.

In one example, to reduce the computational burden, the types of input performance indicator measurements may be pre-selected using engineering judgment. On the other hand, if an input performance indicator measurement is included that turns out to have little bearing on the target performance indicator, the weight factor ultimately assigned to that input performance indicator measurement should be small after the application of the genetic algorithm. Thus, other than increasing the processing load, inclusion of that input performance indicator measurement should not undermine the predictive model. In this regard, in one example, initial parameters may be machine selected. In fact, in one example, it may be preferable to avoid preconceptions of human experts and to start with blind exploration of the data, which may reveal new correlations that are unknown by the human experts or which may even seem contradictory to prevailing knowledge.

In one example, a correlation coefficient "Re" may be calculated in accordance with Equation 3:

$$R_c=\text{corr}(D_c(t+T),Q_c(t)) \quad \text{Equation 3:}$$

using historical data over a study period (e.g., 12 hours, one day, three days, a week, etc.) and over a relevant portion of a cellular network (e.g., on a per-cell basis, on a per-sector basis, etc.). For illustrative purposes, it is assumed that the dependency of dropped call behavior on selected input performance indicator measurement is similar from cell to cell. Therefore, a separate set of weights $\{w_1, w_2, w_3, \ldots, w_N\}_T$ is not calculated for each cell in the network. Instead, for a given lag time "T," the genetic algorithm is applied to determine a set of weights for use with any cell. Thus, for a given candidate weight set, "$R_c$" may be calculated using historical data, or "training data" for each cell in a sample of cells drawn from the cellular network and the average of the resulting "$R_c$" values may be averaged to obtain a correlation value "R" that characterizes the set of sample cells as a whole.

From among a plurality of candidate weight sets, the genetic algorithm determines a set of weights "$w_n$" that maximizes "R," the average of the cell-level "$R_c$" values in the sample, where "$R_c$" is the correlation between the aggregate metric "$Q_c$" and the dropped call rate "$D_c$" based on historical data for a given cell (or a sector, or other portions of the cellular network). In one example, the average correlation strength "R" for the sample cells is maximized separately for each lag time of interest (e.g., one hour, two hours, etc.). In other words, the genetic algorithm is applied to different training data to determine a set of weights that predicts a dropped call rate one hour out (T=1 hour), a second set of weights that best predicts dropped call rate two hours out (T=2 hours), a third set of weights that best predicts dropped call rate three hours out (T=3 hours), and so forth. Note that for a given lag time "T," the strength of the correlation determines how useful the weighted average is for prediction. In other words, finding a best set of weights may not provide an operationally useful result if the correlation is low. In addition, for a given lag time "T," even if high correlation is observed, the usefulness may still be limited for values of "T" that are small. For example, if the correlation is strong for T=5 minutes, little operational benefit may result because with only five minutes warning, there may be little that can be done to prevent a high dropped call rate. In contrast, with T=15 minutes or T=30 minutes, it may be possible to successfully invoke a mitigation procedure.

It should be noted that a traditional method for maximizing the correlation between inputs and the predictive output would be to search the space of possible weight sets to find the set that leads to the largest correlation. For example, the correlation could be calculated for a grid of points spanning an N-dimensional space for training data obtained from a set of sample cells, where the grid may be iteratively refined and the correlation recalculated until the maximum is found. For example, suppose the training data set contains five measurement types. Each measurement type may have an associated weight factor $w_n$. In an initial pass, a grid of points may be evaluated with a granularity of 0.1 for each weight factor, e.g., nine possible values of $w_n$ from 0.1 to 0.9 for each of the five measurements in the set. The result is $9^5$ (approximately 59,000) data points to examine in the weight space in the first pass. In the first pass, a number of local maxima may be found. In a second pass, regions around the local maxima may be selected to examine with a finer grid to more precisely determine the local maxima, and additional passes may be made until an overall maximum is found which is relatively unchanged from earlier passes.

In contrast, in accordance with the present disclosure a "genetic algorithm" is applied to find the weight factors of a final weight set for a predictive model. In this approach, an initial generation of "individuals," e.g., candidate weight sets, may be created. In one example, to assemble the initial generation, the weight factors associated with each normalized input performance indicator measurement may be set using an increment of 0.2 for a total of four values between 0.2 and 0.8. In an example with five types of input performance indicator measurements, the initial generation may include $4^5$ (approximately 1,000) data points to examine, rather than the 59,000 data points described above. It should be noted that each weight factor in a candidate weight set is analogous to a chromosome characterizing an individual in a biological system. Although the initial generation may represent a much coarser grid than the brute force approach described above, through "natural selection" over many iterations (generations) an optimal weight set may be efficiently found.

In one example, the "fitness" of each individual (candidate weight set) may be assessed as described earlier by calculating the "R" value for the candidate weight set. Individuals with higher fitness, i.e., higher R values, are given a greater chance of being used to create the next generation of individuals (candidate weight sets), analogous to "natural selection" in a biological system. In one example, a "tournament selection" technique may be used to select a pool of individuals used in assembling the next generation. In one example, the pool may contain a percentage of individuals of the current generation, e.g., 30 percent, 50 percent, 60 percent, etc. The tournament selection technique gives preference to the fitter individuals. This means that weight factors of fitter individual are more likely to contribute to the weight factors of individuals (candidate weight sets) in a next generation, and it means that less fit individuals are less likely to contribute to the next generation or may be eliminated entirely.

In one example, the number of tournaments (the number of pair selections) conducted is equal to the number of individuals to be created in the next generation. In one example, the same population size is maintained from generation to generation. In other examples, the population may grow or shrink in successive generations. If the population size is allowed to vary from one generation to the next, the size of the next generation may be determined as a function of the percentage or the number of individuals in the current generation having a fitness value above or below a specified threshold. In a given tournament, one way to select the first member of the pair is to assign a probability of selection to each individual in the population as its R-value divided by the sum of all R-values. The second member of the pair may then be selected from the remaining members of the population (i.e., not including the individual selected as the first member) in the same way, but with the sum of all R-values taken across the population excluding the first member already selected. A variation may comprise assigning probabilities based on some function of R (e.g., $R^2$ or $R^{0.5}$) that would enhance or reduce the chance of selection of individuals with higher R-values and/or lower R-values as compared with a direct proportionality. Another variation is to exclude from the selection process a subset of the population. For example, the excluded subset may comprise individuals whose R-value falls in the bottom 25 percent. The excluded subset may alternatively be comprised of those individuals with an R-value below 0.35, for example.

In one example, new individuals are created by probabilistically choosing pairs from the tournament selection pool and causing "crossover" of weights between individuals of each pair. This is analogous to genetics where a child will inherit some genes from one parent and some from the other parent. One way in which crossover can be carried out is to select a weight $w_1$ from one or the other of the pair with equal probability. Another way is to make the probability of selection from a member of a pair proportional to the fitness value of that individual. Another way is to make the probability of selection proportional to some function of the fitness value (e.g., $R^2$). In one example, following crossover of weights to form a new candidate individual, the weights are renormalized, e.g., each weight resulting from the crossover operation is divided by the sum of all weights to ensure that the new sum of weights is one.

Some of the weight factors of resulting individuals are further modified by applying probabilistic "mutations" (e.g., random mutations) to one or more of the weight factors. In other words, a weight factor is selected randomly and a change is applied to that weight factor. This analogous to a random gene mutation in biological system. In one example, mutation processing of the weights of a candidate individual that has emerged from crossover processing is performed independently for each weight in the weight set. In other words, an overall probability of mutation is used to determine whether a given weight will experience a mutation for each weight without regard to whether other weights in the individual are mutating. The mutated value of a weight thus selected may be determined probabilistically using a uniform distribution or using another probability distribution (e.g., one that favors values near the extremes or one that favors values near the middle). Alternatively, a mutated value may be determined non-probabilistically by applying a function to the weight. For instance, the mutated value could be the arithmetic complement of the original value (e.g., 1 minus the original value).

In another example, mutations may be generated by first determining probabilistically whether a candidate individual will be subject to mutation. For an individual thus determined to be subject to mutation, the determination for each weight as to whether it will mutate and of the resulting value may be performed independently as above. In one example, a dependency among the weights may be applied. For instance, weights may be selected successively at random from weights not already considered, with the probability of mutation for a selected weight dependent on the number of weights that already have been mutated. This approach could be used, for example, to increase or decrease the likelihood of multiple mutations occurring for those individuals experiencing at least one mutation.

In one example, following application of weights to a given candidate individual as part of the mutation processing, the weights are renormalized. For instance, in one example, each weight resulting from mutation processing is divided by the sum of all weights to ensure that the new sum across weights is one. It should be noted that in one example, the order of crossover and mutation processing may be reversed such that mutation processing is carried out prior to crossover processing. After these steps, the new generation is complete. The fitness of each individual in the new generation may be evaluated as described earlier. In one example, multiple iterations to produce new generations of individuals may continue until the highest correlation R-value observed in the population/pool of individuals is essentially unchanged over two or more generations, e.g., the change in R-value is below a certain criterion. In one example, the process may continue for a number of generations/iterations, e.g., based upon a maximum computation time that may be assigned by a network operator. In one example, the process may continue until the highest correlation value is stabilized or the maximum computation time is reached, whichever comes first. In one example, the weight set with the highest R-value from a final generation is selected for the final weight set to use in the predictive model.

Thereafter, the predictive model may be deployed and applied to non-training data. For instance, new input performance indicator measurements may be gathered and applied to the predictive model to generate a prediction regarding the target performance indicator, such as a number of dropped calls "$D_c$." For example, the "predictive model" may comprise Equation 1 above, where weight factors per Equation 2 comprise final weight factors determined via the genetic algorithm as described herein. In one example, at least one aspect of the cellular network may be adjusted in response to the prediction. For instance, the output of the predictive model may be a prediction of a number of dropped calls at time t+T based upon a set of input performance indicator measurements $\{m_1(t), m_2(t), m_3(t), \ldots, m_N(t)\}$ at time "t." In one example, the input performance indicator measurements and the prediction may relate to a portion of the cellular network, e.g., a particular cell or sector. For instance, the prediction may indicate that a certain number of dropped calls are anticipated for a given cell at time t+T. In addition, in one example, if the number of dropped calls exceeds a threshold, the network operations may implement a recovery procedure. For instance, the base station equipment may be reset, a new remote radio head (and/or a new baseband unit) may be deployed at or near the cell to take over coverage for the cell that is anticipated to have a high number of dropped calls, the radiation gain patterns of one or more nearby cells may be adjusted to provide coverage to the cell that is anticipated to have a high number of dropped calls, and so forth.

In another example, the target performance indicator of the predictive model may be a number of radio link interruption (RLI) events. In such an example, when the predictive model indicates that a large number of radio link interruption (RLI) events may occur at a given cell at time t+T based upon the set of input performance indicator measurements $\{m_1(t), m_2(t), m_3(t), \ldots, m_N(t)\}$ at time "t," the network operator may configure user equipment (UE) to utilize increased preference factors for nearby cells and/or to utilize a decreased preference factor for the cell so that a lesser number of UE are likely to connect to the given cell. In general, the type of adjustment(s) to the cellular network that may be applied vary depending upon the type of target performance indicator that is being predicted via the predictive model, the severity of the network degradation that may be indicated by the output of the predictive model for a particular future time t+T, and so forth.

It is computationally intensive to adjust all of the parameters to come up with optimal weight factors. However, using a genetic algorithm may provide an optimized weight set for a predictive model that can be obtained within a processing time that may still give useful and actionable information based upon the predictive capabilities. For instance, to come up with a weight set on the fly to be used for predicting network problems five minutes in the future, a brute force algorithm may take too long to compute the weights. In contrast, with a genetic algorithm, optimal weight factors may be determined quickly and applied to incoming data to still provide a useful prediction several minutes in advance of a network problem, such as a number of dropped calls exceeding a threshold. In addition, the weight factors may continue to be adjusted by running the genetic algorithm so that the weight factors that are utilized for making predictions may be updated to remain relevant. For instance, it is not necessarily the case that a weight set determined for a given day, week, season, time of day, day of week, etc. will be useful at a different time, date, etc. Other solutions to come up with predictive models tend to be run once, and then the predictive model is applied to new data once created. The predictive model may occasionally be recomputed, such as once a day, once a week, etc. In contrast, due to the efficiency of the genetic algorithm, it may run in parallel to the deployed predictive model and may be applied to update/refresh the predictive model on an ongoing basis.

It should be noted that the above described process may be expanded to include additional operations, and that other, further, and different examples may include variations of the above. For example, a tradeoff in convergence may be calculated to determine the number of input performance indicator measurements to utilize for the predictive model. For instance, it may be determined to use 50 input performance indicator measurements versus 10 input performance indicator measurements if the time lag is large (e.g., where T=1 hour, and the convergence time (the time for highest R-value(s) to stabilize) is estimated to be only 5 minutes). In one example, if a weight factor for an input performance indicator measurement drops below a threshold (e.g., in a final weight set selected from a final generation), it may then be dropped from the predictive model completely for purposes of deploying the predictive model after it is generated. Alternatively, or in addition, if after several iterations of the genetic algorithm or at a final generation, certain weight factors have faded to irrelevance, the input performance indicator measurements associated with these weight factors could be replaced with other input performance indicator measurements and the genetic algorithm may be re-run to determine whether there is any improvement to the predictive accuracy of the predictive model. For instance, the best input performance indicator measurements may change depending upon the time interval/lag time being considered. In one example, replacement input performance indicator measurements may be selected by a network operator. In another example, the new input performance indicator measurements may be automatically selected, e.g., randomly from performance indicator types that have not previously be considered.

In one example, the granularly of weight factors may be adjusted based upon the desirability of the speed/convergence time of the genetic algorithm. For instance, weights factors may be selected between 0 and 1 with increments of 0.1, 0.2, etc. The number of input performance indicator measurements under consideration will affect the speed of the genetic algorithm and may therefore also impact or be evaluated in conjunction with the granularity that may be selected for utilization. In one example, each generation is the same size. For instance, if there are 1000 individuals in a current generation, there will be 1000 pairings to come up with 1000 individuals of the next generation. In another example, it may be allowed to increase the population size from one generation to the next. In one example, it may be allowed to increase the population size for several generations and to reduce the population size for several generations. For instance, the population size may be reduced in one or more generations toward the end of the number of iterations of the genetic algorithm, e.g., if the number of generations/iterations is predefined or selected in advance. In another example, the population size may be allowed to randomly fluctuate within a predefined range to mimic what may happen in real biological systems.

In one example, the "a" and "b" parameters of Equation 1 may be determined after the final weight set has been selected, e.g., using the same training data as was used to select the final weight set. For example, time-series data from the same sample cells over the same historical time interval can be used to generate a set of data points ($D_c(t+T), Q_c(t)$), which are then used to determine the parameters "a" and "b" using linear regression techniques (e.g., least squares). Alternatively, a different body of training data (e.g., different sample cells and/or a different historical time interval) can be used to determine the parameters "a" and "b". Thus, these and other aspects of the present disclosure are further discussed below in connection with the examples of FIGS. 1-4.

To better understand the present disclosure, FIG. 1 illustrates an example network, or system 100 in which examples of the present disclosure for adjusting at least one aspect of a cellular network using a predictive model based upon a genetic algorithm may operate. In one example, the system 100 includes a telecommunication service provider network 170. The telecommunication service provider network 170 may comprise a cellular network 101 (e.g., a 4G/Long Term Evolution (LTE) network, a 4G/5G hybrid network, or the like), a service network 140, and a core network, e.g., an IP Multimedia Subsystem (IMS) core network 115. The system 100 may further include other networks 180 connected to the telecommunication service provider network 170. FIG. 1 also illustrates various mobile endpoint devices, e.g., user equipment (UE) 116 and 117. The UE 116 and 117 may each comprise a cellular telephone, a smartphone, a tablet computing device, a laptop computer, a pair of computing glasses, a wireless enabled wristwatch, or any other cellular-capable mobile telephony and computing device (broadly, "a mobile endpoint device").

In one example, the cellular network 101 comprises an access network 103 and a core network, Evolved Packet Core (EPC) network 105. In one example, the access network 103 comprises a cloud RAN. For instance, a cloud RAN is part of the 3$^{rd}$ Generation Partnership Project (3GPP) 5G specifications for mobile networks. As part of the migration of cellular networks towards 5G, a cloud RAN may be coupled to an EPC network until new cellular core networks are deployed in accordance with 5G specifications. In one example, access network 103 may include cell sites 111 and 112 and a baseband unit (BBU) pool 114. In a cloud RAN, radio frequency (RF) components, referred to as remote radio heads (RRHs), may be deployed remotely from baseband units, e.g., atop cell site masts, buildings, and so forth. In one example, the BBU pool 114 may be located at distances as far as 20-80 kilometers or more away from the antennas/remote radio heads of cell sites 111 and 112 that are serviced by the BBU pool 114.

Although cloud RAN infrastructure may include distributed RRHs and centralized baseband units, a heterogeneous network may include cell sites where RRH and BBU components remain co-located at the cell site. For instance, cell site 113 may include RRH and BBU components. Thus, cell site 113 may comprise a self-contained "base station." With regard to cell sites 111 and 112, the "base stations" may comprise RRHs at cell sites 111 and 112 coupled with respective baseband units of BBU pool 114.

In accordance with the present disclosure, any one or more of cell sites 111-113 may be deployed with antenna and radio infrastructures, including multiple input multiple output (MIMO) and millimeter wave antennas. Furthermore, in accordance with the present disclosure, a base station (e.g., cell sites 111-113 and/or baseband units within BBU pool 114) may comprise all or a portion of a computing device or system, such as computing system 400, and/or processing system 402 as described in connection with FIG. 4 below, and may be configured to provide one or more functions for adjusting at least one aspect of a cellular network using a predictive model based upon a genetic algorithm, and for performing various other operations in accordance with the present disclosure. For instance, cell sites 111-113 and/or baseband units within BBU pool 114 may be configured to perform functions such as those described below in connection with the example method 300 of FIG. 3.

Figure 4:
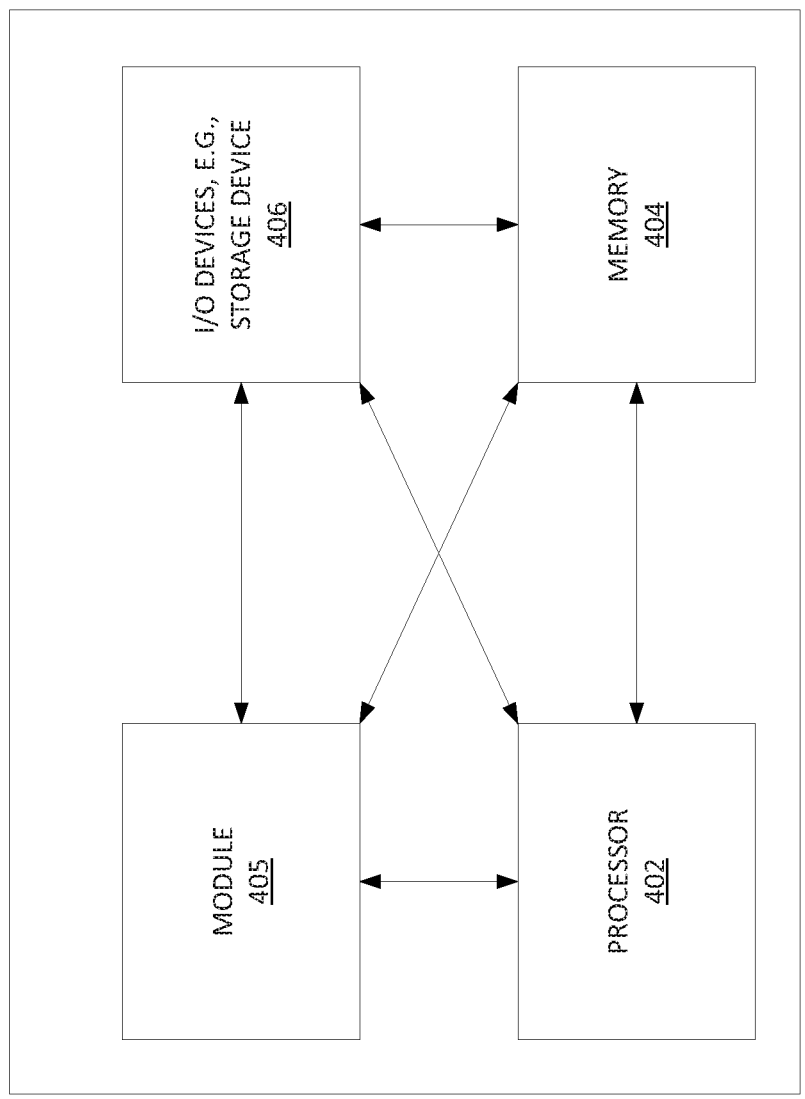
FIG. 4 illustrates an example of a computing device, or computing system, specifically programmed to perform the steps, functions, blocks, and/or operations described herein.

In addition, it should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 4 and discussed below) or multiple computing devices collectively configured to perform various steps, functions, and/or operations in accordance with the present disclosure.

As further illustrated in FIG. 1, CPE 120 may comprise a user equipment, e.g., a mobile endpoint device comprising a cellular telephone, a smartphone, a tablet computing device, a laptop computer, or any other cellular-capable mobile telephony and computing devices. In one example, CPE 120 may comprise a wireless transceiver for a fixed wireless broadband (FWB) deployment with one or more directional antennas (e.g., having a half-power azimuthal beamwidth of 120 degrees or less, 90 degrees or less, 60 degrees or less, etc.).

In one example, each of the UE 116 and 117, and the CPE 120 may comprise all or a portion of a computing device or system, such as computing system 400, and/or processing system 402 as described in connection with FIG. 4 below, and may be configured to provide one or more functions for collecting performance indicator measurements and for transmitting performance indicator measurements to one or more devices in cellular network 101 or in other portions of telecommunication service provider network 170, and for performing various other operations in accordance with the present disclosure.

To illustrate, UE 116, UE 117, and/or CPE 120 may receive wireless signal from one or more of cell sites 111-113, capture performance indicator measurements based upon the wireless signals, and transmit the measurements to the cellular network 101. The performance indicator measurements may pertain to performance indicators such as: a received signal strength, a bit error rate, a packet loss rate, a round trip time, a delay measure, a beam failure event, a radio link interruption event, a random access procedure failure event, or the like.

The transmitting may be to the same one of cell sites 111-113 that transmits one or more wireless signals upon which a performance indicator measurement is based, or may be to a different one of cell sites 111-113. For example, the UE 116, UE 117, and/or CPE 120 may collect a measurement of at least one performance indicator in an RRC_IDLE mode, and may transmit the measurement at a later time when the UE 116, UE 117, and/or CPE 120 reconnects to the cellular network 101, e.g., in an RRC_CONNECTED mode, which may involve a different cell site as the UE 116, UE 117, and/or CPE 120 moves throughout the environment.

In one example, cell sites 111-113 may collect performance indicator measurements from UE 116, UE 117, and/or CPE 120, as well as other endpoint devices and may process the measurements (e.g., in accordance with the method 300 of FIG. 3) or forward the measurements to other components of the telecommunication service provider network 170. In one example, cell sites 111-113 also collect performance indicator measurements. For instance, cell sites 111-113 may measure, obtain, record, collect, and/or store for a given time interval: a number of beam failure events, radio link interruption events, or radio link failure events, a number of dropped calls, a number of active calls, active data sessions, active radio access bearers, and so forth. In one example, cell sites 111-113 may process these measurements in the same or a similar manner as measurements obtained from UE 116, UE 117, and/or CPE 120. For instance, performance indicator measurements, regardless of the origin, may be used to determine a final weight set for a genetic algorithm-based predictive model for a particular target performance indicator, and/or may be used as subsequent input performance indicator measurements to the predictive model once deployed with a final weight set.

In one example, the EPC network 105 provides various functions that support wireless services in the LTE environment. In one example, EPC network 105 is an Internet Protocol (IP) packet core network that supports both real-time and non-real-time service delivery across a LTE network, e.g., as specified by the 3GPP standards. In one example, cell sites 111 and 112 in the access network 103 are in communication with the EPC network 105 via baseband units in BBU pool 114. In operation, UE 116 may access wireless services via the cell site 111 and UE 117 may access wireless services via the cell site 112 located in the access network 103. It should be noted that any number of cell sites can be deployed in access network. In one illustrative example, the access network 103 may comprise one or more cell sites.

In EPC network 105, network devices such as Mobility Management Entity (MME) 107 and Serving Gateway (SGW) 108 support various functions as part of the cellular network 101. For example, MME 107 is the control node for the LTE access network. In one embodiment, MME 107 is responsible for UE (User Equipment) tracking and paging (e.g., such as retransmissions), bearer activation and deactivation process, selection of the SGW, and authentication of a user. In one embodiment, SGW 108 routes and forwards user data packets, while also acting as the mobility anchor for the user plane during inter-cell handovers and as the anchor for mobility between 5G, LTE and other wireless technologies, such as 2G and 3G wireless networks.

In addition, EPC network 105 may comprise a Home Subscriber Server (HSS) 109 that contains subscription-related information (e.g., subscriber profiles), performs authentication and authorization of a wireless service user, and provides information about the subscriber's location. The EPC network 105 may also comprise a packet data network (PDN) gateway 110 which serves as a gateway that provides access between the EPC network 105 and various data networks, e.g., service network 140, IMS core network 115, other network(s) 180, and the like. The packet data network gateway 110 is also referred to as a PDN gateway, a PDN GW or a PGW. In addition, the EPC network 105 may include a Diameter routing agent (DRA) 106, which may be engaged in the proper routing of messages between other elements within EPC network 105, and with other components of the system 100, such as a call session control function (CSCF) (not shown) in IMS core network 115. For clarity, the connections between DRA 106 and other components of EPC network 105 are omitted from the illustration of FIG. 1.

In one example, service network 140 may comprise one or more devices, such as application server (AS) 145 for providing services to subscribers, customers, and or users. For example, telecommunication service provider network 170 may provide a cloud storage service, web server hosting, and other services. As such, service network 140 may represent aspects of telecommunication service provider network 170 where infrastructure for supporting such services may be deployed. In one example, AS 145 may comprise all or a portion of a computing device or system, such as computing system 400, and/or processing system 402 as described in connection with FIG. 4 below, specifically configured to provide one or more service functions in accordance with the present disclosure, such as a network-based secure data storage for performance indicator measurements. For instance, cell sites 111-113 may collect performance indicator measurements, and in some cases other related information, such as time stamp information, (broadly "performance indicator measurement records") from cells sites 111-113, from UE 116, UE 117, and/or CPE 120, and may forward the performance indicator measurement records to AS 145 for storage. In this regard, it should be noted that examples of the present disclosure are described with respect to performance indicator measurements from at least a portion of a cellular network 101, e.g., from cell sites 111-113. However, it should be understood that performance indicator measurements from other portions of cellular network 101 may be utilized as inputs for a genetic algorithm-based predictive model. For instance, MME 107 and/or SGW 108 may respectively collect and report a processor utilization ratio, a memory utilization ratio, a percentage load, a number of UE or other endpoint devices being serviced by MME 107 and/or SGW 108, or being serviced by a particular sector, cell, or an area comprising a cluster of cells, and so forth. Although a single application server, AS 145, is illustrated in service network 140, it should be understood that service network 140 may include any number of components to support one or more services that may be provided to one or more subscribers, customers, or users by the telecommunication service provider network 170.

In one example, other networks 180 may represent one or more enterprise networks, a circuit switched network (e.g., a public switched telephone network (PSTN)), a cable network, a digital subscriber line (DSL) network, a metropolitan area network (MAN), an Internet service provider (ISP) network, and the like. In one example, the other networks 180 may include different types of networks. In another example, the other networks 180 may be the same type of network. In one example, the other networks 180 may represent the Internet in general.

In accordance with the present disclosure, any one or more of the components of EPC network 105 may comprise network function virtualization infrastructure (NFVI), e.g., SDN host devices (i.e., physical devices) configured to operate as various virtual network functions (VNFs), such as a virtual MME (vMME), a virtual HHS (vHSS), a virtual serving gateway (vSGW), a virtual packet data network gateway (vPGW), and so forth. For instance, MME 107 may comprise a vMME, SGW 108 may comprise a vSGW, and so forth. In this regard, the EPC network 105 may be expanded (or contracted) to include more or less components than the state of EPC network 105 that is illustrated in FIG. 1. In this regard, the EPC network 105 may also include a self-optimizing network (SON)/software defined network (SDN) controller 190.

In one example, SON/SDN controller 190 may function as a self-optimizing network (SON) orchestrator that is responsible for activating and deactivating, allocating and deallocating, and otherwise managing a variety of network components. For instance, SON/SDN controller 190 may activate and deactivate antennas/remote radio heads of cell sites 111 and 112, respectively, may allocate and deactivate baseband units in BBU pool 114, and may perform other operations for activating antennas based upon a location and a movement of a mobile endpoint device or a group of mobile endpoint devices, in accordance with the present disclosure.

In one example, SON/SDN controller 190 may further comprise a SDN controller that is responsible for instantiating, configuring, managing, and releasing VNFs. For example, in a SDN architecture, a SDN controller may instantiate VNFs on shared hardware, e.g., NFVI/host devices/SDN nodes, which may be physically located in various places. In one example, the configuring, releasing, and reconfiguring of SDN nodes is controlled by the SDN controller, which may store configuration codes, e.g., computer/processor-executable programs, instructions, or the like for various functions which can be loaded onto an SDN node. In another example, the SDN controller may instruct, or request an SDN node to retrieve appropriate configuration codes from a network-based repository, e.g., a storage device, to relieve the SDN controller from having to store and transfer configuration codes for various functions to the SDN nodes.

In one example, SON/SDN controller 190 may comprise all or a portion of a computing device or system, such as computing system 400, and/or processing system 402 as described in connection with FIG. 4 below, and may be configured to provide one or more functions for adjusting at least one aspect of a cellular network using a predictive model based upon a genetic algorithm, and for performing various other operations in accordance with the present disclosure. For example, SON/SDN controller 190 may ensure that a cell site 111-113 and/or baseband unit of BBU pool 114 is provisioned with configuration code which, when executed by a processing system of the respective component(s), cause at least one aspect of the respective cell site 111-113 to be adjusted. For instance, SON/SDN controller 190 may store such configuration code and provision the code to the respective component(s), or may direct the respective component(s) to obtain the configuration code from another repository. In one example, the configuration code may cause a cell site 111-113 to steer a beam in a particular direction or to utilize a particular radiation gain pattern in response to a prediction from a genetic algorithm-based predictive model. In another example, the configuration code may cause a cell site 111-113 to offer a particular set of modulation coding schemes. For instance, a cell site may not offer one or more modulation coding schemes when application of input performance indicator measurements to a genetic algorithm-based predictive model results in a prediction of a high number of radio link interruption (RLI) events, or may offer selected modulation coding schemes that are considered to be more robust to RLI events.

In accordance with the present disclosure, SON/SDN controller 190 may also control various components within EPC network 105 and/or within access network 103 to support the traffic that is accommodated by the activation of antennas/remote radio heads of cell sites 111 and 112, respectively, and the allocation of baseband units in BBU pool 114, traffic that is rerouted due to activations and deactivations of cell sites 111-113, or any one or more components, thereof, and so on. For instance, SON/SDN controller 190 (e.g., performing functions of a SON orchestrator) may activate an antenna of cell site 111 and assign a baseband unit in BBU pool 114 when a number of call blocking events at cell site 111 is anticipated to exceed a threshold in accordance with a prediction from a genetic algorithm-based predictive model. SON/SDN controller 190 (e.g., performing functions of a SDN controller) may further instantiate VNFs to function as routers, switches, gateways, and the like to ensure that sufficient backhaul resources are available for the traffic to transit the access network 103 and/or EPC network 105. In addition, as mentioned above, any one or more of the DRA 106, MME 107, SGW 108, HSS 109, and PGW 110 may comprise VNFs instantiated on host devices. As such, SON/SDN controller 190 may perform similar operations to instantiate, configure, reconfigure, and decommission such components in support of examples of the present disclosure.

In one example, SON/SDN controller 190 may retrieve and process performance indicator measurement records from AS 145 where the records may be stored after collection via cell sites 111-113, components of EPC network 105, and so on. For example, SON/SDN controller 190 may determine a final weight set for a genetic algorithm-based predictive model for a target performance indicator based upon a first plurality of performance indicator measurements from the performance indicator measurement records (e.g., a training data set). SON/SDN controller 190 may further apply a second plurality input performance indicator measurements from the performance indicator measurement records to the genetic algorithm-based predictive model to provide a prediction regarding the target performance indicator and may adjust aspects of cellular network 101 in response to the prediction, such as: activating a remote radio head, activating a baseband unit, deactivating a remote radio head, deactivating a baseband unit, changing a transmit power of a base station, changing a boresight direction of an antenna array (including adjusting tilt and azimuth bearing), changing a beamwidth of a gain pattern of an antenna array, changing a channel coding scheme availability at a base station, changing a base station backhaul configuration, and so forth.

Accordingly, the SON/SDN controller 190 may be connected directly or indirectly to any one or more network elements of EPC network 105, and of the system 100 in general. Due to the relatively large number of connections available between SON/SDN controller 190 and other network elements, none of the actual links to the application server are shown in FIG. 1. Similarly, intermediate devices and links between DRA 106, MME 107, SGW 108, cell sites 111 and 112, PDN gateway 110, and other components of system 100 are also omitted for clarity, such as additional routers, switches, gateways, and the like.

As further illustrated in FIG. 1, EPC network 105 may further include an application server (AS) 130, which may comprise all or a portion of a computing device or system, such as computing system 400, and/or processing system 402 as described in connection with FIG. 4 below, and may be configured to perform various operations in connection with adjusting at least one aspect of a cellular network using a predictive model based upon a genetic algorithm, and for performing various other operations in accordance with the present disclosure. For instance, AS 130 may receive performance indicator measurements from cells sites 111-113, from UE 116, UE 117, and/or CPE 120, and/or from other components of cellular network 101, such as BBU pool 114, MME 107, SGW 108, and so forth. In one example, the receiving may be via cell sites 111-113. In another example, performance indicator measurements and related information may be stored in a record, e.g., at AS 145. As such, the receiving may comprise AS 130 retrieving the record from AS 145. In one example, AS 130 may determine a final weight set for a genetic algorithm-based predictive model for a target performance indicator based upon a first plurality of performance indicator measurements (e.g., a training data set). AS 130 may further apply a second plurality of the input performance indicator measurements to the genetic algorithm-based predictive model to provide a prediction regarding the target performance indicator, and may adjust at least one aspect of cellular network 101 in response to the prediction. In one example, the adjusting the at least one aspect of the cellular network 101 may comprise the same or similar adjustments a described above in connection with SON/SDN controller 190. In one example, AS 130 may configure components of the cellular network 101 directly. For instance, AS 130 may maintain communications with BBU pool 114, cell sites 111-113, CPE 120, and so forth, via PDN gateway 110 and SGW 108, for example. In another example, AS 130 may send a command or request to SON/SDN controller 190 for the SON/SDN controller 190 to configure the relevant component(s) of the cellular network 101. In this regard, it should be noted that some of the functions described herein with respect to SON/SDN controller 190 may instead be performed by AS 130, and vice versa.

The foregoing description of the system 100 is provided as an illustrative example only. In other words, the example of system 100 is merely illustrative of one network configuration that is suitable for implementing examples of the present disclosure. As such, other logical and/or physical arrangements for the system 100 may be implemented in accordance with the present disclosure. For example, the system 100 may be expanded to include additional networks, such as network operations center (NOC) networks, additional access networks, and so forth. The system 100 may also be expanded to include additional network elements such as border elements, routers, switches, policy servers, security devices, gateways, a content distribution network (CDN) and the like, without altering the scope of the present disclosure. In addition, system 100 may be altered to omit various elements, substitute elements for devices that perform the same or similar functions, combine elements that are illustrated as separate devices, and/or implement network elements as functions that are spread across several devices that operate collectively as the respective network elements. For instance, in one example, SON/SDN controller 190 may be spilt into separate components to operate as a SON orchestrator and a SDN controller, respectively. Similarly, although the SON/SDN controller 190 is illustrated as a component of EPC network 105, in another example SON/SDN controller 190, and/or other network components may be deployed in an IMS core network 115 instead of being deployed within the EPC network 105, or in other portions of system 100 that are not shown, while providing essentially the same functionality. Similarly, functions described herein with respect to AS 130 may alternatively or additional be provided by AS 145.

In addition, although aspects of the present disclosure have been discussed above in the context of a long term evolution (LTE)-based wireless network, examples of the present disclosure are not so limited. Thus, the teachings of the present disclosure can be applied to other types of wireless networks (e.g., a 2G network, a 3G network, a 5G network, an integrated network, e.g., including any two or more of 2G-5G infrastructure and technologies, and the like), that are suitable for use in connection with examples of the present disclosure for channel sounding via an in-service base station. For example, as illustrated in FIG. 1, the cellular network 101 may represent a "non-stand alone" (NSA) mode architecture where 5G radio access network components, such as a "new radio" (NR), "gNodeB" (or "gNB"), and so forth are supported by a 4G/LTE core network (e.g., a Evolved Packet Core (EPC) network 105). However, in another example, system 100 may instead comprise a 5G "standalone" (SA) mode point-to-point or service-based architecture where components and functions of EPC network 105 are replaced by a 5G core network, which may include an access and mobility management function (AMF), a user plane function (UPF), a session management function (SMF), a policy control function (PCF), a unified data management function (UDM), an authentication server function (AUSF), an application function (AF), a network repository function (NRF), and so on. For instance, in such a network, application server (AS) 130 of FIG. 1 may represent an application function (AF) for adjusting aspects of a cellular network in response to measurements of performance indicators by a mobile endpoint device at particular locations and orientations, and for performing various other operations in accordance with the present disclosure. In addition, any one or more of cell sites 111-113 may comprise 2G, 3G, 4G and/or LTE radios, e.g., in addition to 5G new radio (NR) functionality. For instance, in non-standalone (NSA) mode architecture, LTE radio equipment may continue to be used for cell signaling and management communications, while user data may rely upon a 5G new radio (NR), including millimeter wave communications, for example. Thus, these and other modifications are all contemplated within the scope of the present disclosure.

Figure 2:
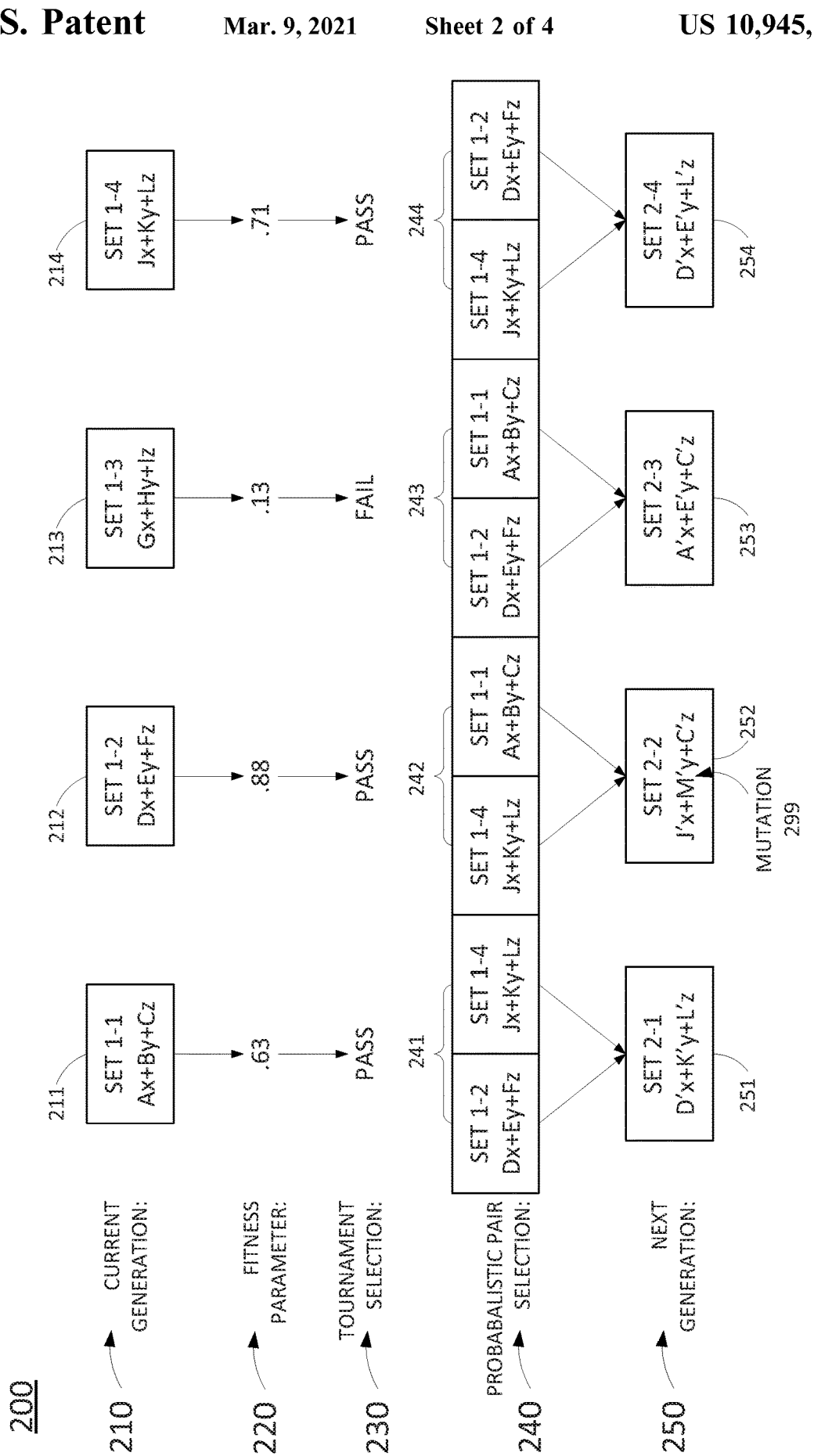
FIG. 2 illustrates an example of an iteration of a genetic algorithm from a current generation to a next generation, in accordance with the present disclosure.

FIG. 2 illustrates an example 200 of an iteration of a genetic algorithm from a current generation to a next generation in accordance with the present disclosure. The example 200 begins with a current generation 210 comprising a plurality of individuals 211-214 (e.g., candidate weight sets 1-1, 1-2, 1-3, and 1-4, respectively) each comprising respective sets of three weight factors (e.g., weight factors A-L) for three input performance indicator measurements $\{x, y, z\}$. In one example, the current generation 210 may comprise a first generation of individuals. In such case, the weight factors for the weight sets of each of the individuals 211-214 may comprise values randomly selected at a fixed interval from between 0 and 1, e.g., in increments of 0.1.

For each of the individuals 211-214 a fitness parameter, or "R-value" may be calculated as described above. It should be noted that the fitness parameters illustrated at 220 are provided by way of example and occupy values between 0 and 1. However, in other, further, and different examples, fitness parameters may occupy a different scale, e.g., taking values between 0 and 2, 0 and 10, 0 and 100, and so forth.

The results of a tournament selection process are illustrated at 230. In one example, the tournament selection process may be in accordance with a threshold number or percentage of individuals. In one example, the threshold may be selected by a network operator. In one example, the threshold may be automatically determined based on a maximum desired processing time. In one example, the threshold may be three individuals (or 75 percent of the population/generation). In this case, individual 213 (candidate weight set 1-3) may fail the tournament selection process, while the other individuals 211, 212, and 214 pass.

Following the results of tournament selection at 230, a number of pairs of individuals may be selected for creating the next generation. For instance, for each pair 241-244, the individuals/candidate weight sets from the current generation 210 may be selected probabilistically based upon the respective fitness parameters. In general, the higher the fitness parameter, the more likely that an individual is selected for a pair. As can be seen in FIG. 2, both individuals 212 and 214 (candidate weight sets 1-2 and 1-4, respectively) are selected three times in accordance with their relatively high fitness parameters.

After selecting the pairs 241-244, individuals 251-254 (candidate weight sets 2-1, 2-2, 2-3, and 2-4 respectively) of the next generation 250 may be created. It should be noted that the weight factors for weight sets of the individuals 251-254 may be selected probabilistically from respective weight factors of the individuals in each of the respective pairs 241-244, e.g., semi-randomly based upon the respective fitness parameters, or 50-50 from each of the individuals in the respective one of pairs 241-244. In one example, weights are renormalized after crossover (and before mutations, if any, are applied) in order to make the new weights add to one (or to whatever weight total was adopted at the outset). For example, after crossover, pair 241 produces individual 251. For individual 251, D may be changed to D' where D'=D/(D+E+F). The prime notation is used for weight factors for each of individuals 251-254 to indicate that the respective weight factors are normalized.

As noted above, mutations may be randomly applied to one or more weight factors in generating a next generation. In this case, individual 252 in the next generation 250 may have received a random mutation 299, e.g., weight factor "M" for input performance indicator measurement "y." It should be noted that weight factor "M" is not present in either of the weight sets from the pair 242 from which individual 252 is created. In one example, weights are also renormalized after mutation. For example, following mutation 299, J may be transformed to J' such that J'=J/(J+M+C). The example 200 of FIG. 2 may continue with respect to generating subsequent generations in the same or a similar manner, e.g., until the highest fitness parameter/R-value stabilizes over several generations, until a maximum processing time is reached, and so forth.

Figure 3:
FIG. 3 illustrates a flowchart of an example method for adjusting at least one aspect of a cellular network using a predictive model based upon a genetic algorithm.

FIG. 3 illustrates a flowchart of an example method 300 for adjusting at least one aspect of a cellular network using a predictive model based upon a genetic algorithm, in accordance with the present disclosure. In one example, steps, functions and/or operations of the method 300 may be performed by a device as illustrated in FIG. 1, e.g., a base station, an application server, or a SON/SDN controller, or any one or more components thereof, such as a processing system, a processing system in conjunction with remote radio heads and/or antenna arrays, and so forth. Alternatively, or in addition, the steps, functions and/or operations of the method 300 may be performed by a processing system comprising a plurality of devices as illustrated in FIG. 1, such as an application server, a SON/SDN controller, a base station, a serving gateway, and so forth. In one example, the steps, functions, or operations of method 300 may be performed by a computing device or system 400, and/or a processing system 402 as described in connection with FIG. 4 below. For instance, the computing device 400 may represent at least a portion of an application server, a SON/SDN controller, a base station, and so forth, in accordance with the present disclosure. For illustrative purposes, the method 300 is described in greater detail below in connection with an example performed by a processing system, such as processing system 402. The method 300 begins in step 305 and may proceed to one of optional steps 310-350 or to step 360.

At optional step 310, the processing system may select a target performance indicator for a predictive model (e.g., a genetic algorithm-based predictive model). The target performance indicator may comprise, for example: a an average received signal strength, an average bit error rate, an average packet loss rate, an average round trip time, an average delay measure, or the like, e.g., with respect to the endpoint devices being served during a given time period at a cell site, in a particular cell site sector, in a given network area, and so forth. The target performance indicator may also comprise: a number or rate of beam failure events, radio link interruption events, random access procedure failure events, dropped calls, blocked calls, and so forth.

At optional step 320, the processing system may select a plurality of performance indicators for the predictive model. For example, the plurality of performance indicators may be selected from the same group of performance indicators described above (however, excluding the target performance indicator). In one example, the plurality of performance indicators may be selected by a network operator, e.g., using engineering judgment and experience, or may be automatically selected, e.g., blindly, randomly, using a previous knowledge base of correlations between performance indicators, or using any other available criteria for automated selection.

At optional step 330, the processing system may determine a lag time for the predictive model. In one example, the lag time may be defined by a network operator. In another example, the lag time may be set based upon a time for an automated recovery procedure for a network problem associated with the target performance indicator. In still another example, a genetic algorithm may be applied for the target performance indicator over several lag times, e.g., to separately determine final weight sets for separate predictive models associated with the target performance indicator for the several lag times.

At optional step 340, the processing system may gather training data comprising a (second) plurality of measurements of the plurality of performance indicators and a plurality of measurement of the target performance indicator. The training data may be gathered from various components of the cellular network such as endpoint devices, UEs, and/or CPEs, cell sites, base stations, and/or baseband units, core network components, and so forth. It should be noted that a cellular network may gather a large number of performance indicator measurements on an ongoing basis for a variety of purposes. Thus, it should be understood with respect to optional step 340 that the generation and/or the collecting of the training data does not necessarily follow the operations of optional steps 310-330. For instance, the cellular network may store historical performance indicator measurements that may be retrieved at a later time to perform the subsequent operations of step 350.

At step 350, the processing system determines a final weight set comprising weight factors to apply to each of the plurality of performance indicators for the predictive model associated with the target performance indicator using a genetic algorithm. In one example, the genetic algorithm includes generating a first plurality of candidate weight sets for a first generation and determining a fitness parameter for each of the first plurality of candidate weight sets. In one example, the fitness parameter comprises a measure of a correlation between an output (e.g., a prediction) of the predictive model using a candidate weight set and a measure of the target performance indicator from the training data. The genetic algorithm may further include selecting weight set pairs from the first plurality of candidate weight sets for generating a second plurality of candidate weight sets in a second generation. For instance, each weight set pair may be selected from the first plurality of candidate weight sets probabilistically based upon the fitness parameters of the first plurality of candidate weight sets. The second plurality of candidate weight sets in the second generation may then be generated from the respective weight set pairs.

In one example, the selecting the weight set pairs from the first plurality of candidate weight sets comprises a tournament selection process. In addition, in one example, the generating the second plurality of candidate weight sets in the second generation from the weight set pairs comprises a crossover process that, for each of the second plurality of candidate weight sets, selects weight factors probabilistically from one or the other of the first plurality of candidate weight sets of a weight set pair.

In one example, the generating the second plurality of candidate weight sets in the second generation from the weight set pairs further includes determining whether to apply a mutation. For instance, for a weight factor of a candidate weight set of the second plurality of candidate weight sets, the processing system may determine whether to apply a mutation in accordance with a mutation ratio, e.g., a probability. In one example, the mutation comprises a value randomly selected between a maximum and a minimum value for the weight factor.

In one example, the genetic algorithm is applied over a plurality of generations. In one example, a number of the plurality of generations is based upon a maximum computational time. In one example, a number of the plurality of generations is based upon a stabilization of a highest fitness parameter among candidate weight sets of a current generation and a highest fitness parameter among candidate weight sets of a previous generation. In one example, the weight factors are selected between a maximum value and a minimum value in a fixed increment, wherein the fixed increment is based upon a maximum computation time or a number of a plurality of generations over which the genetic algorithm is applied. Similarly, in one example, a number of the first plurality of candidate weight sets is based upon a maximum computation time. In one example, the determining the final weight set comprises selecting, from a final generation, a weight set having a highest fitness parameter as the final weight set.

At step 360, the processing system gathers a (first) plurality of measurements of the plurality of performance indicators for at least a portion of the cellular network. In one example, step 360 may comprise the same or similar operations as described above in connection with optional step 340. However, the (first) plurality of measurements of the plurality of performance indicators gathered at step 360 may comprise live or "real-time" data, and/or historical data that is still relevant for making actionable predictions for a future time period in accordance with the lag time.

At optional step 370, the processing system may normalize the (first) plurality of measurements of the plurality of performance indicators prior to applying the predictive model. For instance, the normalizing may include transforming each of the (first) plurality of measurements of the plurality of performance indicators into the absolute value of the number of standard deviations that the measurement differs from the measurement's historical mean over the recent past (e.g., over the past week, over the past day or two, over the past 12 hours, etc.). In one example, absolute value is used to ensure that the normalized measurement value is non-negative regardless of whether the deviation from average of the measurement itself is positive or negative.

At step 380, the processing system applies the predictive model to the (first) plurality of measurements of the plurality of performance indicators to generate a prediction for the target performance indicator. For example, the "predictive model" may be in the same or similar form as Equation 1 above, where weight factors per Equation 2 comprise final weight factors determined via the genetic algorithm according to step 350. For example, if the target performance indicator is a number of dropped calls (e.g., at a cell site), the output of step 380 may comprise a predictive value of a number of dropped calls based upon the (first) plurality of measurements gathered at step 360.

At step 390, the processing system adjusts at least one aspect of the cellular network in response to the prediction. For example, step 390 may comprise restarting a base station, activating a remote radio head, activating a baseband unit, deactivating a remote radio head, deactivating a baseband unit, changing a transmit power of a base station, changing a boresight direction of a base station antenna array (including adjusting vertical tilt and azimuth bearing), changing a beamwidth of a gain pattern of a base station antenna array, changing a channel coding scheme availability at a base station, changing a base station backhaul configuration, and so forth. The processing system may also adjust the configuration of beam management related measurement resources, such as adjusting timer/counters at a base station and/or at mobile endpoint devices in communication with the base station, and so on. It should be noted that step 390 may comprise any number of different types of adjustments to configure or reconfigure the cellular network in response to the prediction of step 380. Following step 390, the method 300 proceeds to step 395 where the method ends.

It should be noted that the method 300 may be expanded to include additional steps or may be modified to include additional operations with respect to the steps outlined above. For example, the method 300 may be repeated for a variety of lag times, for a plurality of different target performance indicators, for different portions of a cellular network, and so forth. In addition, the operations described above may be modified to be applied to other domains. For example, in a manufacturing setting the "KPI" of interest could be the part rejection rate at time t+T and the "performance measurements" at time t could be metrics at time t related to a machine used in processing the part such as ambient temperature, ambient humidity, line voltage, number of parts currently in process, etc. If a large number of such machines were used to produce the type of part under consideration, a sample of such machines (analogous to cells) could be used to assemble training data. As another example, the entity of interest could be an electric vehicle. The "KPI" could be battery drain rate at time t+T and the "performance measurements" at time t could be metrics such as brake application rate, speed, accelerator application rate, etc. A set of vehicles from the overall population could be used to assemble the training data.

In addition, although not specifically specified, one or more steps, functions, or operations of the method 300 may include a storing, displaying, and/or outputting step as required for a particular application. In other words, any data, records, fields, and/or intermediate results discussed in the method can be stored, displayed, and/or outputted either on the device executing the method or to another device, as required for a particular application. Furthermore, steps, blocks, functions or operations in FIG. 3 that recite a determining operation or involve a decision do not necessarily require that both branches of the determining operation be practiced. In other words, one of the branches of the determining operation can be deemed as an optional step. Furthermore, steps, blocks, functions or operations of the above described method can be combined, separated, and/or performed in a different order from that described above, without departing from the examples of the present disclosure. Thus, these and other modifications are all contemplated within the scope of the present disclosure.

FIG. 4 depicts a high-level block diagram of a computing device or processing system specifically programmed to perform the functions described herein. As depicted in FIG. 4, the processing system 400 comprises one or more hardware processor elements 402 (e.g., a central processing unit (CPU), a microprocessor, or a multi-core processor), a memory 404 (e.g., random access memory (RAM) and/or read only memory (ROM)), a module 405 for adjusting at least one aspect of a cellular network using a predictive model based upon a genetic algorithm, and various input/output devices 406 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). In accordance with the present disclosure input/output devices 406 may also include antenna elements, antenna arrays, remote radio heads (RRHs), baseband units (BBUs), transceivers, power units, and so forth. Although only one processor element is shown, it should be noted that the computing device may employ a plurality of processor elements. Furthermore, although only one computing device is shown in the figure, if the method 300 as discussed above is implemented in a distributed or parallel manner for a particular illustrative example, i.e., the steps of the above method 300, or the entire method 300 is implemented across multiple or parallel computing devices, e.g., a processing system, then the computing device of this figure is intended to represent each of those multiple computing devices.

Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor 402 can also be configured or programmed to cause other devices to perform one or more operations as discussed above. In other words, the hardware processor 402 may serve the function of a central controller directing other devices to perform the one or more operations as discussed above.

It should be noted that the present disclosure can be implemented in software and/or in a combination of software and hardware, e.g., using application specific integrated circuits (ASIC), a programmable gate array (PGA) including a Field PGA, or a state machine deployed on a hardware device, a computing device or any other hardware equivalents, e.g., computer readable instructions pertaining to the method discussed above can be used to configure a hardware processor to perform the steps, functions and/or operations of the above disclosed method 300. In one example, instructions and data for the present module or process 405 for adjusting at least one aspect of a cellular network using a predictive model based upon a genetic algorithm (e.g., a software program comprising computer-executable instructions) can be loaded into memory 404 and executed by hardware processor element 402 to implement the steps, functions, or operations as discussed above in connection with the illustrative method 300. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method can be perceived as a programmed processor or a specialized processor. As such, the present module 405 for adjusting at least one aspect of a cellular network using a predictive model based upon a genetic algorithm (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette, and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various examples have been described above, it should be understood that they have been presented by way of illustration only, and not a limitation. Thus, the breadth and scope of any aspect of the present disclosure should not be limited by any of the above-described examples, but should be defined only in accordance with the following claims and their equivalents.

What is claimed is:

1. A method comprising:
   determining, by a processing system including at least one processor, a final weight set comprising weight factors to apply to each of a plurality of performance indicators for a predictive model associated with a target performance indicator, wherein the final weight set is selected from among a plurality of candidate weight sets using a genetic algorithm, and wherein the plurality of candidate weight sets comprises weight set pairs selected from an immediately previous generation of candidate weight sets, wherein each weight set pair of the weight set pairs is selected from the immediately previous generation of candidate weight sets probabilistically based upon fitness parameters of the immediately previous generation of candidate weight sets;

gathering, by the processing system, a first plurality of measurements of the plurality of performance indicators for at least a portion of a cellular network;

applying, by the processing system, the predictive model to the first plurality of measurements of the plurality of performance indicators to generate a prediction for the target performance indicator; and adjusting, by the processing system, at least one aspect of the cellular network in response to the prediction.

2. The method of claim 1, further comprising:
selecting the target performance indicator for the predictive model.

3. The method of claim 1, further comprising:
selecting the plurality of performance indicators for the predictive model.

4. The method of claim 1, further comprising:
determining a lag time for the predictive model.

5. The method of claim 1, further comprising:
normalizing the first plurality of measurements of the plurality of performance indicators prior to the applying the predictive model.

6. The method of claim 1, further comprising:
gathering training data comprising a second plurality of measurements of the plurality of performance indicators and a plurality of measurements of the target performance indicator.

7. The method of claim 6, wherein the genetic algorithm comprises:
generating a first generation of candidate weight sets comprising a first plurality of candidate weight sets;
determining fitness parameters for the first plurality of candidate weight sets, wherein each fitness parameter of the fitness parameters for the first plurality of candidate weight sets comprises a measure of a correlation between an output of the predictive model using a candidate weight set of the first plurality of candidate weight sets and a measure of the target performance indicator from the training data;
selecting weight set pairs from the first plurality of candidate weight sets for generating a second generation of candidate weight sets comprising a second plurality of candidate weight sets, wherein each weight set pair from the first plurality of candidate weight sets is selected for generating the second generation of candidate weight sets probabilistically based upon the fitness parameters of the first plurality of candidate weight sets; and
generating the second plurality of candidate weight sets from the weight set pairs from the first plurality of candidate weight sets.

8. The method of claim 7, wherein the selecting the weight set pairs from the first plurality of candidate weight sets comprises a tournament selection process.

9. The method of claim 7, wherein the generating the second plurality of candidate weight sets from the weight set pairs from the first plurality of candidate weight sets comprises a crossover process that, for each of the second plurality of candidate weight sets, selects weight factors probabilistically from candidate weight sets of a weight set pair of the first plurality of candidate weight sets.

10. The method of claim 7, wherein a number of the first plurality of candidate weight sets is based upon a maximum computation time.

11. The method of claim 7, wherein the genetic algorithm is applied over a plurality of generations of candidate weight sets, wherein the plurality of generations comprises at least the immediately previous generation, the first generation, and the second generation.

12. The method of claim 11, wherein the weight factors are selected between a maximum value and a minimum value in a fixed increment, wherein the fixed increment is based upon:
a maximum computation time; or
a number of the plurality of generations.

13. The method of claim 11, wherein a number of the plurality of generations is based upon a maximum computational time.

14. The method of claim 11, wherein a number of the plurality of generations is based upon a stabilization of a highest fitness parameter among candidate weight sets of a current generation of candidate weight sets of the plurality of generations and a highest fitness parameter among candidate weight sets of a previous generation of candidate weight sets of the plurality of generations.

15. The method of claim 11, wherein the determining the final weight set comprises selecting, from a final generation of candidate weight sets of the plurality of generations, a weight set having a highest fitness parameter as the final weight set.

16. The method of claim 1, wherein the plurality of performance indicators comprises at least two of:
a received signal strength;
a bit error rate;
a packet loss rate;
a round trip time;
a delay measure;
a beam failure event;
a radio link interruption event; or
a random access procedure failure event.

17. The method of claim 1, wherein the adjusting the at least one aspect of the cellular network comprises at least one of:
restarting a base station;
activating a remote radio head;
activating a baseband unit;
deactivating a remote radio head;
deactivating a baseband unit;
changing a transmit power of a base station;
changing a boresight direction of a base station antenna array;
changing a beamwidth of a gain pattern of a base station antenna array;
changing a channel coding scheme availability at a base station; and
changing a base station backhaul configuration.

18. A device comprising:
a processing system including at least one processor; and
a computer-readable medium storing instructions which, when executed by the processing system, cause the processing system to perform operations, the operations comprising:
determining a final weight set comprising weight factors to apply to each of a plurality of performance indicators for a predictive model associated with a target performance indicator, wherein the final weight set is selected from among a plurality of candidate weight sets using a genetic algorithm, and wherein the plurality of candidate weight sets comprises weight set pairs selected from an immediately previous generation of candidate weight sets, wherein each weight set pair of the weight set pairs is selected from the immediately previous generation of candidate weight sets probabilistically based upon fitness parameters of the immediately previous generation of candidate weight sets;

gathering a first plurality of measurements of the plurality of performance indicators for at least a portion of a cellular network;

applying the predictive model to the first plurality of measurements of the plurality of performance indicators to generate a prediction for the target performance indicator; and adjusting at least one aspect of the cellular network in response to the prediction.

19. A non-transitory computer-readable medium storing instructions which, when executed by a processing system including at least one processor, cause the processing system to perform operations, the operations comprising:

determining a final weight set comprising weight factors to apply to each of a plurality of performance indicators for a predictive model associated with a target performance indicator, wherein the final weight set is selected from among a plurality of candidate weight sets using a genetic algorithm, and wherein the plurality of candidate weight sets comprises weight set pairs selected from an immediately previous generation of candidate weight sets, wherein each weight set pair of the weight set pairs is selected from the immediately previous generation of candidate weight sets probabilistically based upon fitness parameters of the immediately previous generation of candidate weight sets;

gathering a first plurality of measurements of the plurality of performance indicators for at least a portion of a cellular network;

applying the predictive model to the first plurality of measurements of the plurality of performance indicators to generate a prediction for the target performance indicator; and adjusting at least one aspect of the cellular network in response to the prediction.

20. The non-transitory computer-readable medium of claim 19, the operations further comprising:

gathering training data comprising a second plurality of measurements of the plurality of performance indicators and a plurality of measurements of the target performance indicator.

* * * * *